Nov. 22, 1955 W. B. DEAN 2,724,344
EQUIPMENT MOUNTING, ESPECIALLY FOR AUXILIARY
EQUIPMENT BENEATH RAILWAY CARS
Filed April 23, 1952 3 Sheets-Sheet 1

INVENTOR.
Walter B. Dean
BY
Maurice A. Crews
ATTORNEY

Nov. 22, 1955    W. B. DEAN    2,724,344
EQUIPMENT MOUNTING, ESPECIALLY FOR AUXILIARY
EQUIPMENT BENEATH RAILWAY CARS
Filed April 23, 1952    3 Sheets-Sheet 2

INVENTOR.
Walter B. Dean
BY
Maurice A. Crewd
ATTORNEY

INVENTOR.
Walter B. Dean
BY
*Maurice A. Crews*
ATTORNEY

United States Patent Office 2,724,344
Patented Nov. 22, 1955

2,724,344

EQUIPMENT MOUNTING, ESPECIALLY FOR AUXILIARY EQUIPMENT BENEATH RAILWAY CARS

Walter B. Dean, Narberth, Pa., assignor to The Budd Company, Philadelphia, Pa., a corporation of Pennsylvania Application April 23, 1952, Serial No. 283,966

5 Claims. (Cl. 105—133)

This invention relates to means for mounting equipment, especially to means for mounting auxiliary equipment beneath the floor of a vehicle, such as a railway car, and has for an object the provision of improvements in this art.

One of the particular objects is to provide a unitary assembly and mounting means for the auxiliary equipment required for an internal combustion engine employed as the prime mover for a vehicle, this equipment including a coolant radiator, a blower fan therefor, a generator, and an air compressor.

Another object is to provide mounting means for such equipment which places the blower and radiator in such position that air is blown across beneath the car so as to encounter the minimum obstruction to its flow but without objectionable blasts across the passenger platform space on the sides of the vehicle.

Another object is to provide a central fan shroud frame which is supported by the center sill of the vehicle and which forms the major base for carrying the other framework and equipment.

Another object is to provide a support for a belt-driven compressor which has separate adjustment relative to the main support whereby the belt may be kept tight at all times.

Another object is to provide a simple and inexpensive mounting which can be easily installed or removed.

The above and other objects and advantages of the invention will be apparent from the following description of an exemplary embodiment, reference being made to the accompanying drawings thereof wherein:

Fig. 5 is a perspective view of the blower fan shroud; and

Fig. 6 is a local horizontal section of a detail, the view being taken on the line 6—6 of Fig. 3.

Figure 1:
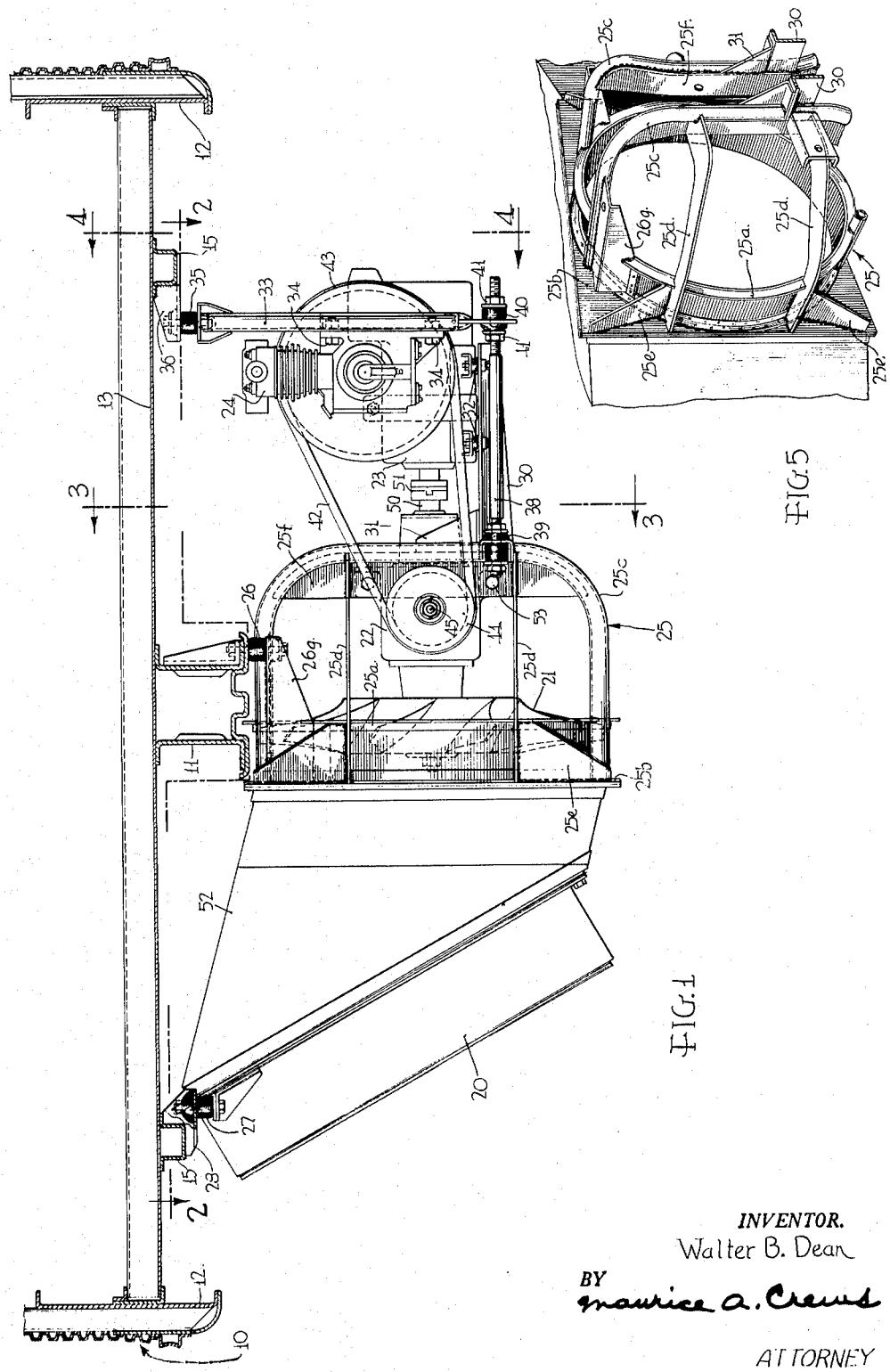
Fig. 1 is a transverse vertical section through a self-propelled vehicle, such as a diesel driven rail car, embodying the invention, the view being taken on the line 1—1 of Fig. 2.
Figure 2:
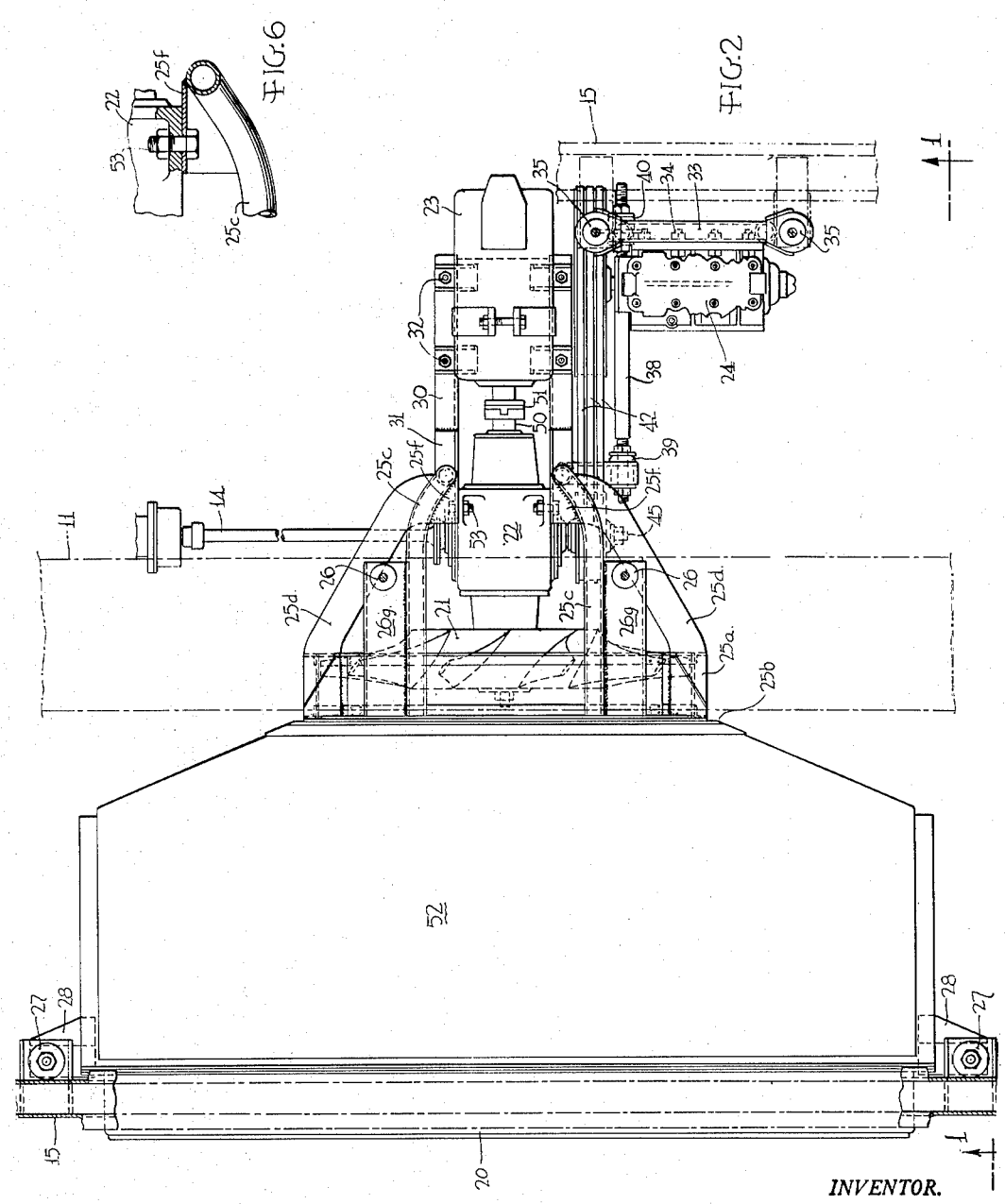
Fig. 2 is a horizontal plan and section taken on the line 2—2 of Fig. 1.

Referring to the drawings, the apparatus is mounted beneath a vehicle, such as a rail car 10, having a center sill 11, side sills 12, a floor frame 13, and a prime mover such as a diesel engine which provides an auxiliary drive shaft 14 extending longitudinally of the vehicle. The floor frame is reinforced on each side between the center sill and a side sill, as by a longitudinally extending inverted channel beam 15 secured to the lower flanges of the floor pan or cross bearers.

The auxiliary apparatus which is mounted as a unit beneath the floor comprises a coolant radiator 20, a blower fan 21, a gear box 22, a generator 23, and a compressor 24. An intermediate frame in the form of a basket-shaped shroud 25 is suspended at one side from the center sill by resilient supports 26. The frame of radiator 20 is suspended from one of the reinforcing beams 15, as by resilient supports 27 carried by brackets 28 secured to the beam.

The generator is carried in cantilever fashion from the shroud frame by projecting bracket beams 30 which are secured to the shroud frame 25, as by welding and gussets 31, the generator being connected to the frame, as by resilient supports 32.

The compressor 24 is carried by a vertical auxiliary frame 33, being connected thereto as by bolts 34, and the frame 33 is suspended from one of the reinforcing beams 15, as by resilient supports 35 carried by brackets 36 secured to the beam. The lower end of the compressor frame 33 is adjustably connected to the shroud frame 25, as by a rod 38 having resilient elements 39 at the shroud end and other resilient elements 40 at the outer end where it is connected to the vertical frame. Adjusting nuts 41 are provided on the threaded outer end of the rod 38 for swinging the lower end of the compressor frame and holding it in position to keep the compressor drive belt 42 tight. The belt, preferably of V-type, operates on a compressor pulley 43 and a drive pulley 44 on a shaft 45 extending out of the gear box 22.

A drive shaft 50 with a flexible coupling 51 connects the generator to the driving mechanism within the gear box 22.

A duct 52 connects the ring 25a of the fan shroud frame 25 with the frame of the radiator 20. The radiator is inclined, as seen in Fig. 1, to shed outward such water as may tend to enter and to avoid a suction draft at close range from the adjacent passenger platform. The fan blows exhaust air out toward the side away from the radiator, the air passing over the compressor and generator. The air bears some heat from the radiator but the generator and compressor run effectively at so much higher temperature that all desired cooling of these units is attained.

The shroud frame 25, in addition to the ring proper 25a which closely surrounds the fan, comprises a face plate 25b which connects with the duct 52, bent tubular members 25c, horizontal plate members 25d, and bracing gussets 25e. The parts are in a large measure secured together by fillet welds, as indicated in Fig. 5.

Figure 3:
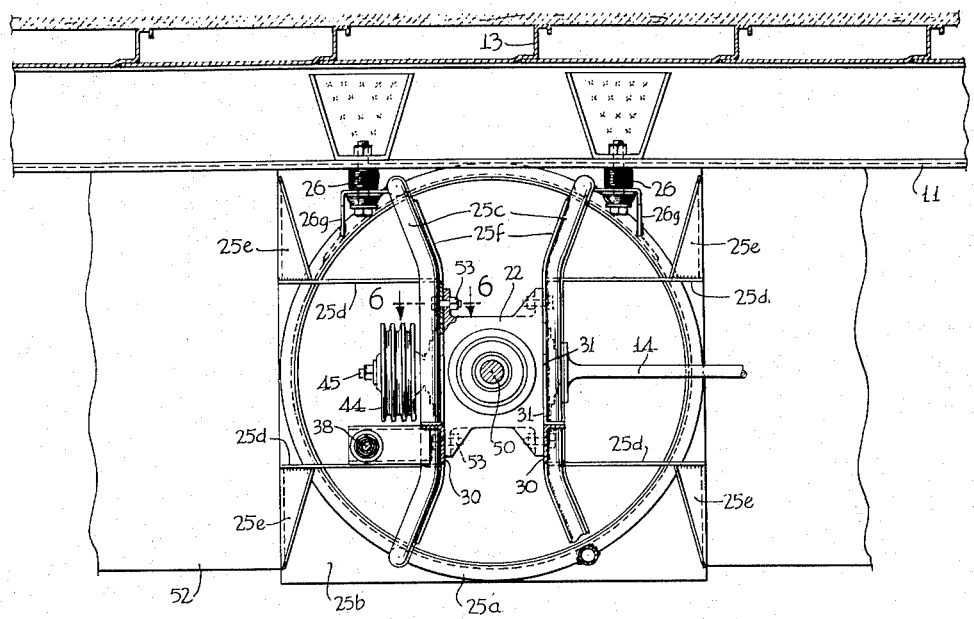
Fig. 3 is a longitudinal vertical section taken on the line 3—3 of Fig. 1.
Figure 4:
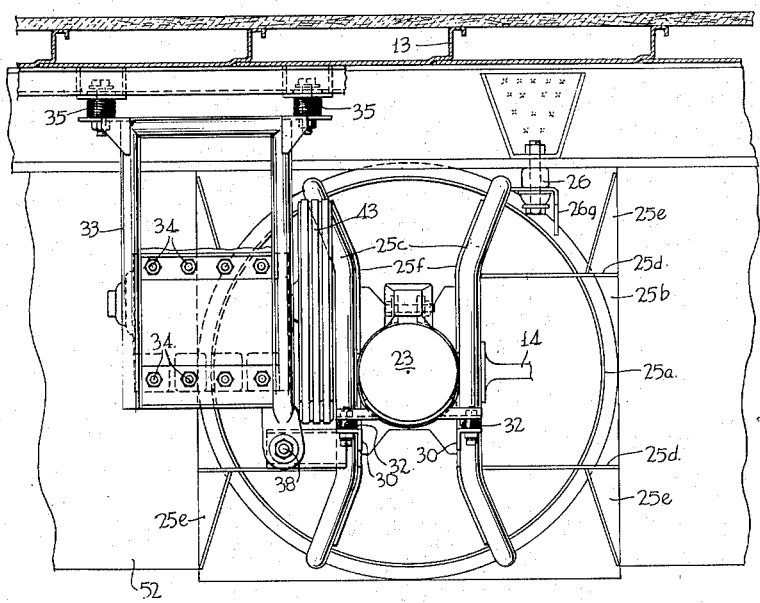
Fig. 4 is a longitudinal vertical elevation and section taken on the line 4—4 of Fig. 1.

As shown in Fig. 3, the gear box unit 22 is secured between the spaced tubular members 25c, as by bolts 53, plates 25f being interposed to assist in making the connection as well as to assist in rigidifying the shroud frame. Reinforcing gusset members 25g are provided at the top for supporting the frame through the elements 26.

It will thus be seen that the mounting means resiliently supports the major auxiliaries of an engine propelled vehicle in a convenient assembly which may be quickly installed and removed. The parts on the mounting means are so arranged relative to each other and to the car that air is directed across the radiator and thence across the gear box, generator, and compressor. Air is drawn up to the radiator at an angle so as to avoid, as far as possible, a strong draft across the station platforms. The compressor mounting is separately supported from the car frame and is adjustably connected to the main frame so as to provide for keeping the drive belt in proper tension.

While one embodiment of the invention has been described, it is to be understood that there may be various embodiments within the general scope of the invention.

What is claimed is:

1. Mounting means for apparatus beneath a vehicle having longitudinal center and side sills, comprising in combination, a fan shroud frame supported beneath the center sill, a drive gear case and blower fan supported on said fan shroud frame, laterally extending brackets secured to said fan shroud frame, a generator carried on said brackets, drive means for said generator from said gear case, a supplemental frame mounted beneath said vehicle at a distance from the center sill, a compressor mounted on said supplemental frame, a driving belt for driving said compressor from said gear box, means between said shroud frame and said supplemental frame for adjusting the one relative to the other, a radiator mounted beneath the vehicle at a distance from said center sill, and a duct disposed between said shroud frame and said radiator.

2. Mounting means for auxiliary apparatus beneath a vehicle, comprising in combination, a frame mounted beneath the vehicle and near the transverse center thereof, a blower fan mounted on said frame to direct air transversely across the car, a radiator mounted at one side of said frame, a duct between said radiator and said fan, means for driving said fan, and a compressor driven from the means for driving said fan.

3. Mounting means for auxiliary apparatus beneath a vehicle, comprising in combination, a main frame mounted beneath the vehicle, driven and driving means carried on said main frame, an auxiliary frame mounted beneath the vehicle, a driven device thereon, driving means between the driving means on said main frame and the driven device carried on said auxiliary frame, means for adjusting the distance between said frames for adjusting said driving means, the driven means on said main frame comprising a blower fan and a generator, and the driven means on said auxiliary frame comprising a compressor, and a radiator carried by said main frame in a position to have air moved thereover by said fan.

4. Mounting means for auxiliary apparatus beneath a vehicle, comprising in combination, a fan shroud frame resiliently supported beneath the transverse mid-portion of the vehicle, a radiator resiliently supported beneath one side of the vehicle, a duct connected between said radiator and said fan shroud frame, a generator supported by said fan shroud frame toward the opposite side of the vehicle from the radiator and in line with the flow of air produced by said fan, and an auxiliary shaft and drive means associated therewith for driving said fan and generator.

5. Mounting means as set forth in claim 4, which further comprises a compressor frame resiliently supported near the side of the vehicle opposite said radiator, resilient lateral connections with adjustment means between the lower portion of said compressor frame and said fan shroud frame, and means for driving a compressor mounted on said compressor frame from the drive means from said auxiliary drive shaft.

References Cited in the file of this patent
UNITED STATES PATENTS

| | | |
|---|---|---|
| 1,231,462 | Tutwiler | June 26, 1917 |
| 1,260,190 | Gross et al. | Mar. 19, 1918 |
| 1,432,904 | Reilly | Oct. 24, 1922 |
| 1,584,090 | Grubler | May 11, 1926 |
| 2,264,950 | Melcher | Dec. 2, 1941 |